Nov. 20, 1923.  
W. H. P. BLANDY ET AL  
1,474,759  
DIRECTOR ELEVATING MECHANISM  
Filed Nov. 26, 1921  7 Sheets-Sheet 1
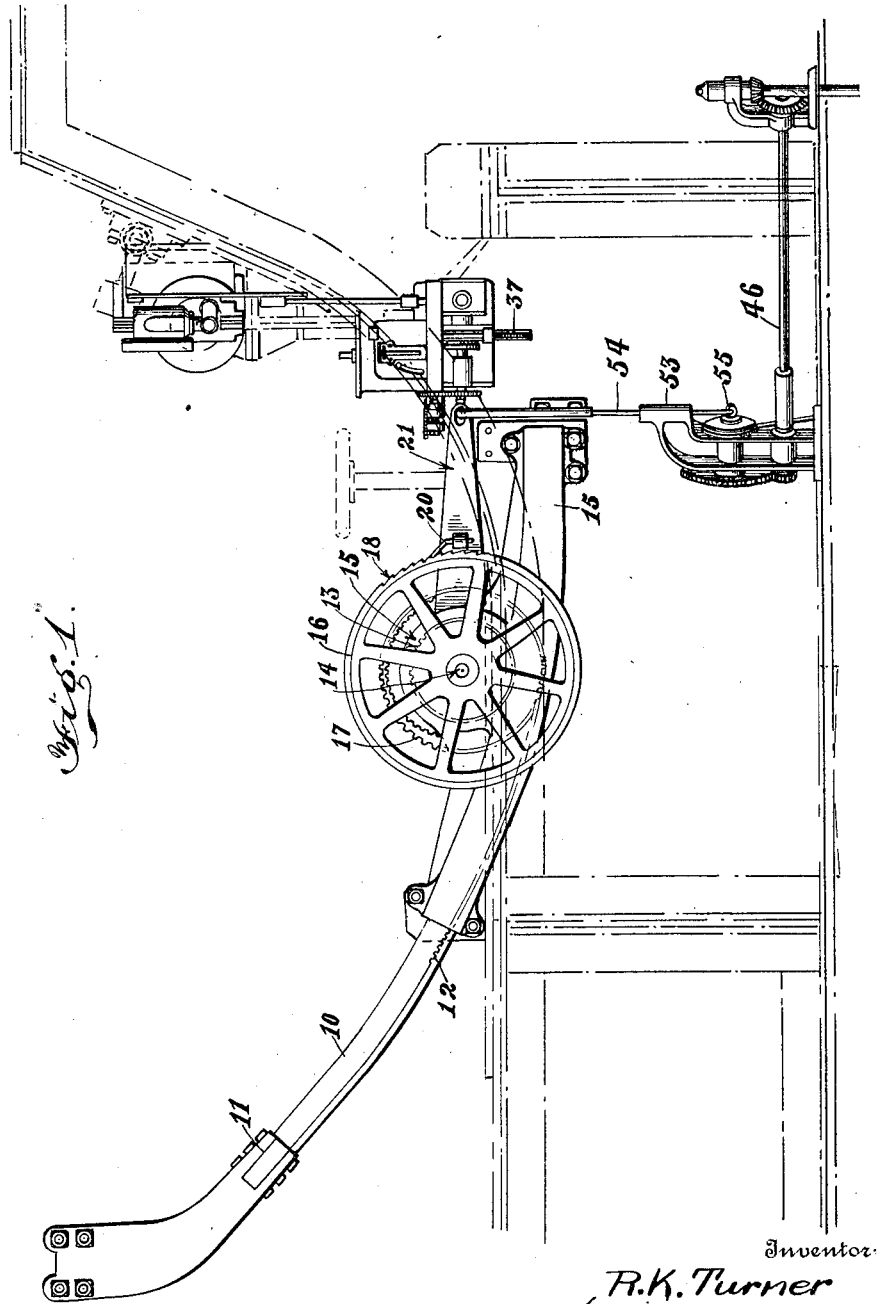
Inventor  
R.K. Turner  
and W.H.P. Blandy  
By  
R.H.Blair, Attorney Nov. 20, 1923.
W. H. P. BLANDY ET AL
1,474,759
DIRECTOR ELEVATING MECHANISM
Filed Nov. 26, 1921    7 Sheets-Sheet 2
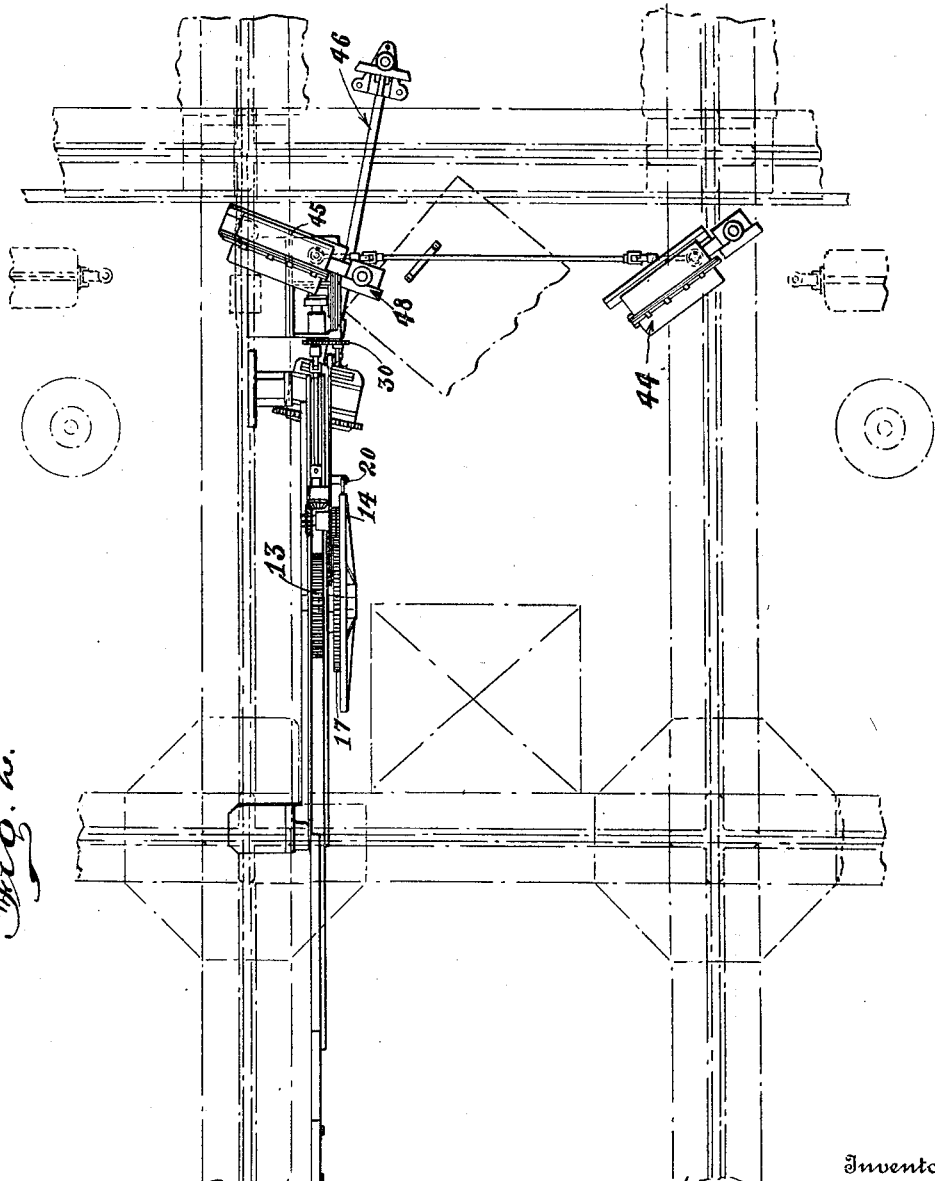

Nov. 20, 1923. 1,474,759
W. H. P. BLANDY ET AL
DIRECTOR ELEVATING MECHANISM
Filed Nov. 26, 1921 7 Sheets-Sheet 3
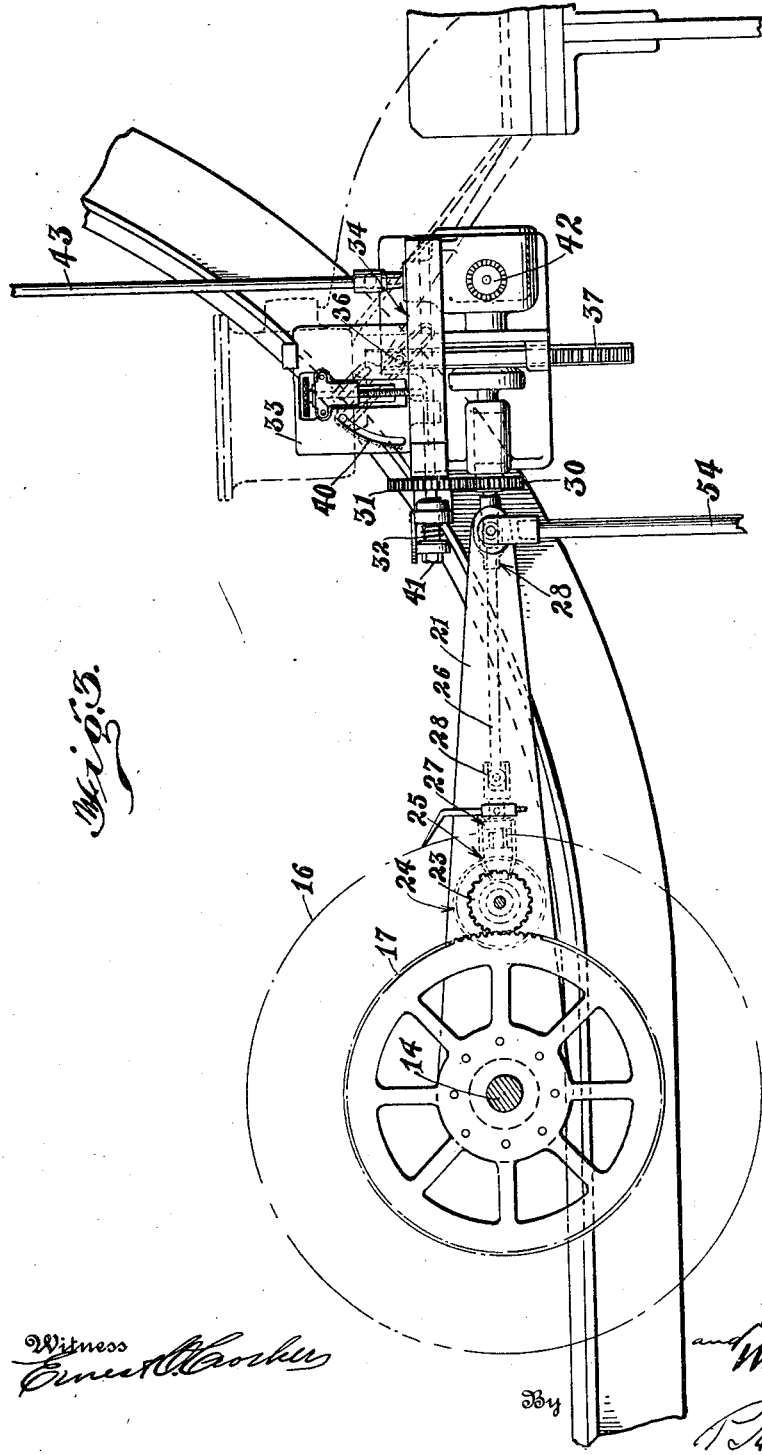
Inventors
R. K. Turner
W. H. P. Blandy

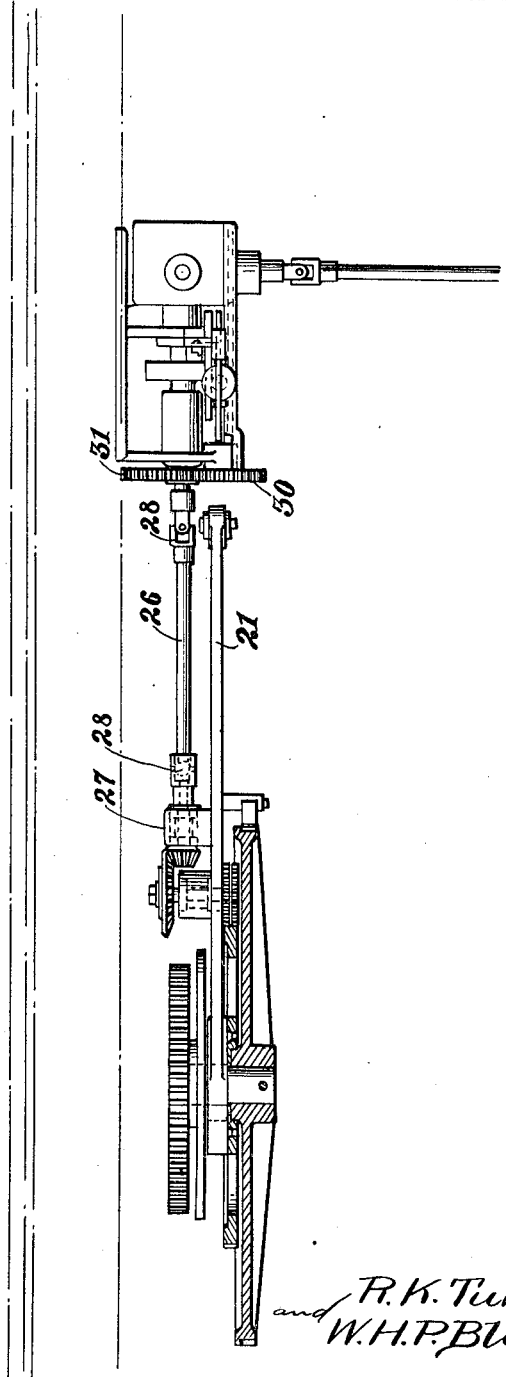

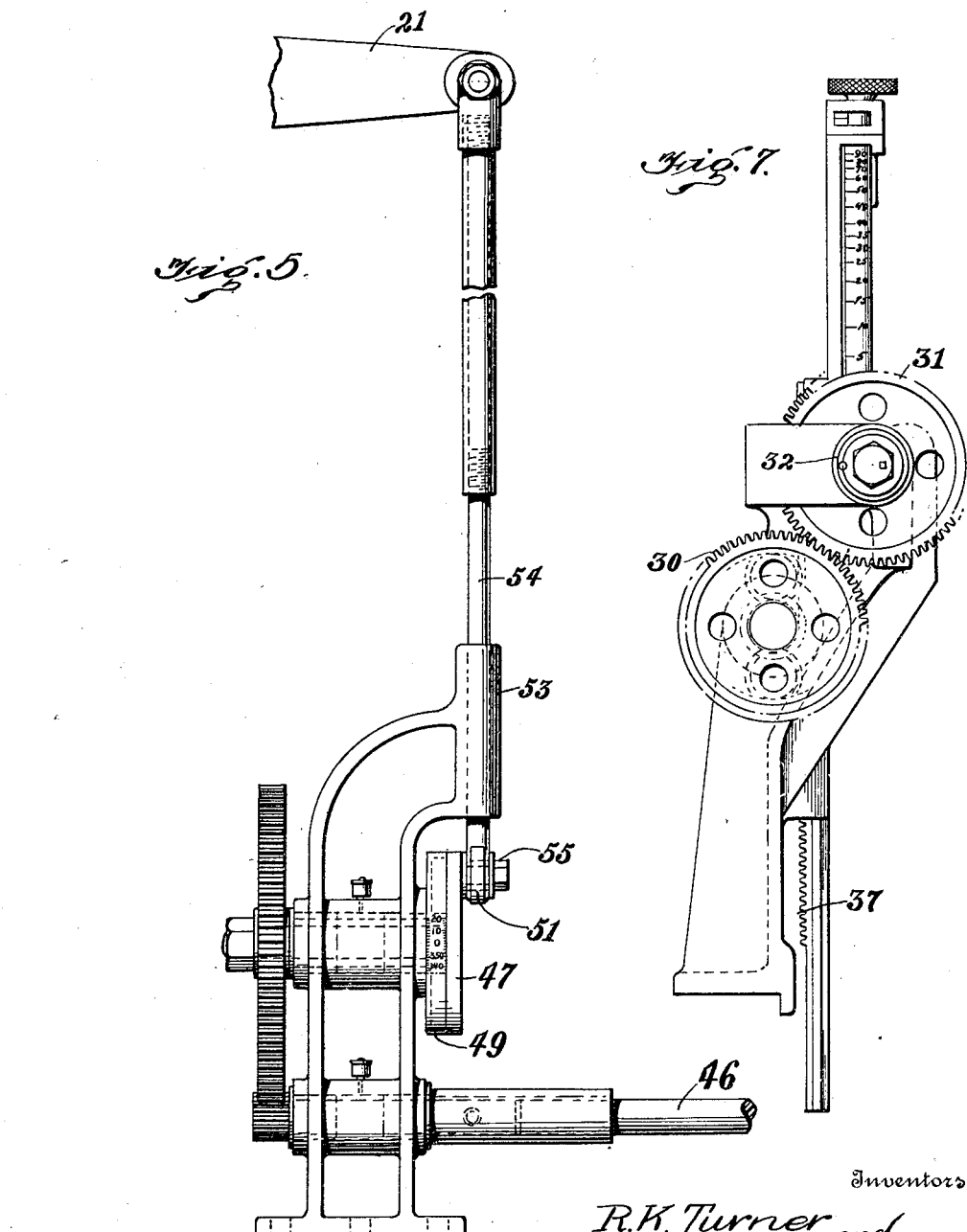

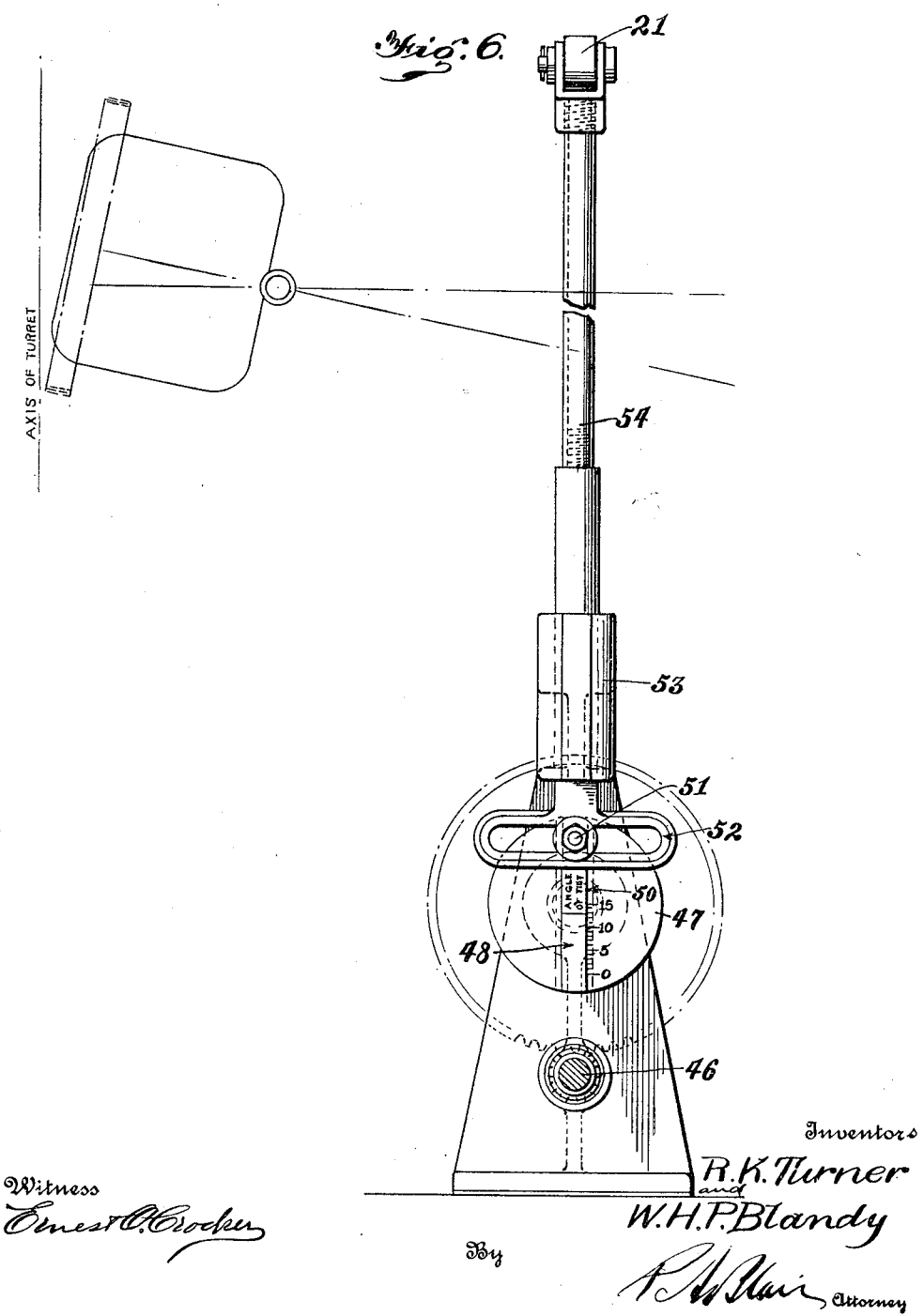

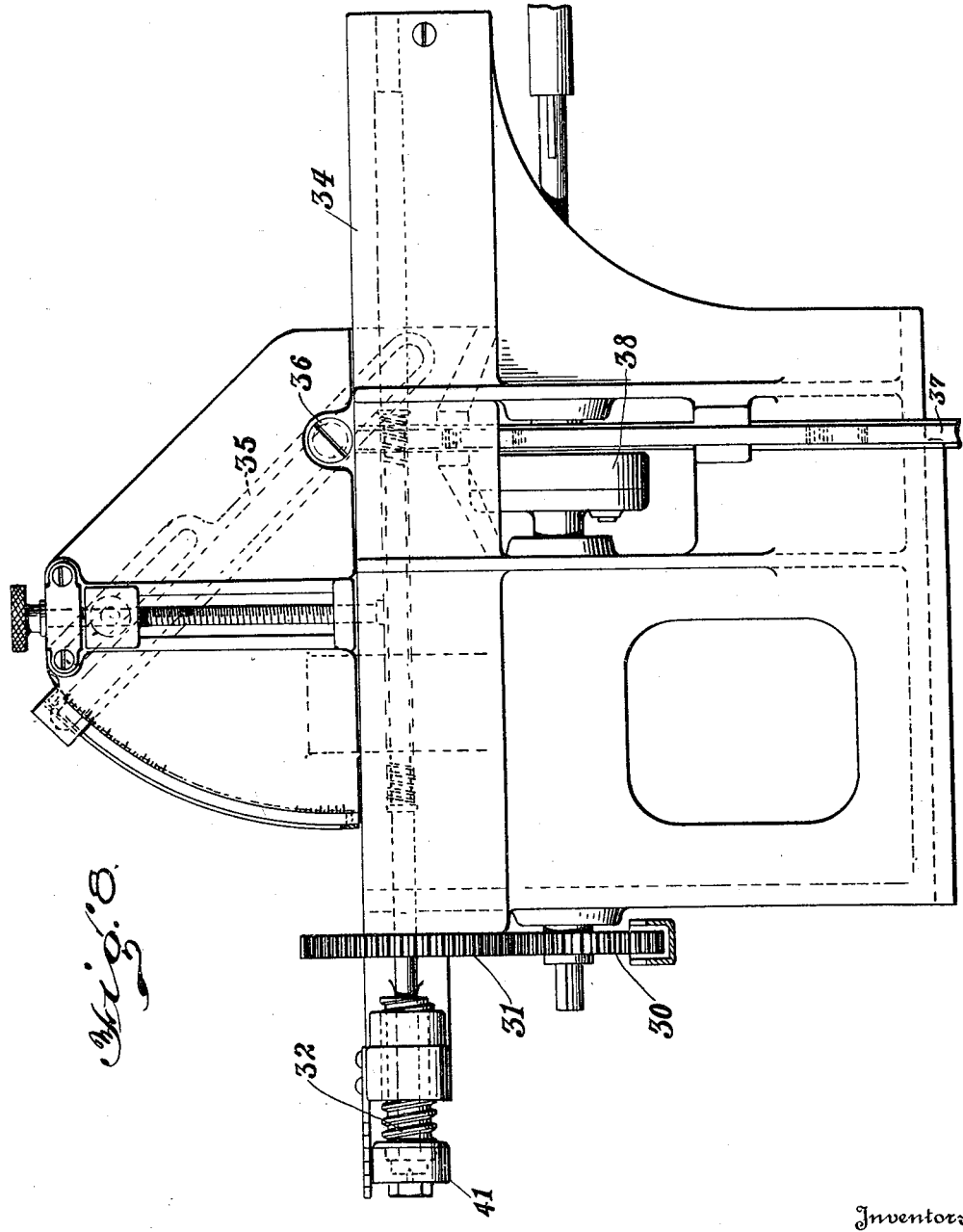

Patented Nov. 20, 1923.

1,474,759

UNITED STATES PATENT OFFICE.

WILLIAM H. P. BLANDY, OF INDIAN HEAD, MARYLAND, AND RICHMOND K. TURNER, OF WASHINGTON, DISTRICT OF COLUMBIA, ASSIGNORS TO THE GOVERNMENT OF THE UNITED STATES.

DIRECTOR ELEVATING MECHANISM.

Application filed November 26, 1921. Serial No. 518,017.

*To all whom it may concern:*

Be it known that we, WILLIAM H. P. BLANDY and RICHMOND K. TURNER, citizens of the United States, residing at Indian Head, Maryland, and Washington, District of Columbia, respectively, have invented new and useful Improvements in Director Elevating Mechanism, of which the following is a specification.

This invention relates to improvements in director elevating mechanism for ordnance and more particularly to an attachment applicable to great guns adapted to correct for any errors which may inherently lie in gun or turret roller paths as well as for loss of muzzle velocity due to erosion of the gun barrel after extensive use.

Before going into a statement of the invention the objects of the invention will perhaps be more apparent from the following explanation. In the construction of turrets on battleships or the installation of guns on deck emplacements it is very difficult to obtain and maintain an absolutely level roller path whereby when the turret or gun is turned from extreme right to extreme left, for example, the guns will maintain the same angle of elevation with reference to a fixed plane in the ship. The surface described by a line down the center of the bore is approximately a plane and the azimuth of the highest point of this plane relative to the ship's head may be any amount, and one of the features of the invention is designed to overcome the error caused by the variable inclination of the gun to any standard fixed plane in the ship by automatically moving a reference point and elevation angle scale whereby the actual elevation of the gun with reference to the standard plane may be correctly indicated for all relative angles of train.

This invention further relates to an improved apparatus for applying to the angle of elevation of a gun an angular correction that will compensate for the loss in muzzle velocity of a projectile fired with a certain mass of propellent from a gun that has previously been fired one or more rounds, this loss of muzzle velocity of the projectile increasing progressively from the time the gun is first fired. This correction is obtained by the solution in an exact or an approximate manner by mechanical means of an empirical or theoretical performance curve or formula showing the successive or total loss of muzzle velocity of a gun as it is fired an increasing number of rounds. The apparatus is so constructed and operates mechanically in such a manner that if a setting of a certain part is made either manually or automatically depending in amount upon the number of rounds previously fired, and if another part is moved or rotated either manually or automatically by an exact or approximate amount depending upon the angle of elevation to which a new gun would be laid to send its projectile to any certain distance, the apparatus will be so operated that at another point there will be indicated or shown a movement that will correspond either to the angular correction that must be applied to the angle of elevation previously mentioned, and that will enable the worn gun to be laid at such an angle that its projectile will be sent approximately the same distance as in the case of a new gun, or to the angle of elevation itself to which the worn gun must be laid for the same purpose. The setting corresponding to the number of rounds fired may be set either manually, in accordance with a scale provided, or automatically by the gun itself as it fires each successive round, the latter setting to be accomplished either by a direct mechanical connection between the gun and the erosion compensator, or by means of an electrical mechanism on the erosion compensator operated by the gun.

With this understanding of the invention in mind the present invention is directed primarily to the provision of a simple and practical means adapted automatically to correct the apparatus indicating the elevation of the guns for errors due to the inclination of the roller path of the gun or turret as well as the errors due to erosion in order that the gun pointer or gun layer will be enabled to lay his gun at the correct angle with reference to the horizon for sending the projectile to a certain distance.

A further object is to provide a mechanism of the above character which may be inexpensively manufactured and assembled as well as applied to guns now in use and without material alterations.

Other objects will be in part obvious and in part hereinafter pointed out.

In the accompanying drawings there is shown one of various possible embodiments of the present invention and in these drawings, Figure 1 is a side elevation of such parts of the mechanism and gun mount as are necessary to understand the invention.

Figure 2 is a plan view of the parts shown in Figure 1.

Figure 3 is an enlarged detail view of part of the mechanism shown in Figure 1.

Figure 4 is a plan view partly in section of the mechanism shown in Figure 3.

Figure 5 is a detail view of a part of the mechanism shown in Figure 1.

Figure 6 is a view at right angles thereto.

Figures 7 and 8 are detail elevational views of parts shown in Figure 1.

Referring now to the drawings in detail and more particularly to Figure 1, an elevating bar 10 is adapted to be connected to a part of a gun slide (not shown) by the member 11 and is provided with teeth 12 along its concave side adapted to mesh with a gear 13 mounted upon a shaft 14 in a relatively fixed support 15. The shaft 14 upon which this gear 13 is keyed is provided with a drum 16 and a larger gear 17. The drum 16 carries on its periphery an auxiliary elevation scale 18, graduated in minutes and coacts with a scale pointer 20 mounted upon and carried by a tilting compensator arm 21. This arm is adapted to be rotated up and down about the axes of the shaft 14 upon which the drum 16 is mounted through a total of approximately 9° being actuated by a tilt compensator rod 54 which is connected with the mechanism hereinafter described and shown more in detail in Figures 5 and 6. This mechanism introduces the correction for roller path tilt.

Referring to Figure 3 of the drawings, it will be seen that the gear 17 is adapted to drive a split pinion 23 which through split double gear 24 and pinion 25 drive a shaft 26 extending substantially parallel with the compensator arm 21. This compensator arm 21 in rotating about the axis of the drum 16 carries the bevel pinion 25 with it as it is mounted in a lug or bearing 27 thereon as shown more clearly in Figure 4 and in this manner introduces a differential motion into the rotation of the shaft 26 which corrects for the tilt. The shaft 26 is provided with two universal slip joints 28 which permit this change of alignment. Through intermeshing gears 30 and 31, Figure 3, the shaft 26 drives a worm 32 which as the gun elevates and depresses causes the erosion corrector plate 33 to move relatively back and forth in suitable guide brackets 34. A slotted arm 35 (Figure 8) is pivotally mounted upon the corrector plate and has this same horizontal fore and aft movement as the worm 32 rotates and being placed at the setting corresponding to the number of rounds previously fired introduces an erosion correction through a roller 36 passing through the slot in the member 35 and rack 37, Figure 7, and internally geared differential member 38. "The rounds fired" scale 40 is graduated on a removable strip so that the scale for erosion corrections may be brought up to date at any time desired to agree with the latest data from experimental firings. It should be noted that the erosion compensator takes care of the change in correction due to a change in range or a change in angle of elevation. Since the "gun angle" is not the actual angle of elevation, however, unless the line of sight from the director-scope to the target is zero with reference to the standard plane the director correction should be set by means of an adjusting device 41 at the end of the worm shaft to correct the setting for an angle different from the angle of deviation due to a list of the ship. The position of the plate 33 will then correspond to the true angle of elevation above the director line of sight. Through bevel gears 42 the final corrected elevation of the gun is transmitted to a vertical shaft 43 and thence to the elevation receivers shown at 44 and 45 in Figure 2.

Referring now to Figure 5, the compensation for roller path tilt is accomplished as follows:—Shafting 46 from the turret or gun training rack transmits the angle of train to disc 47 which rotates once for each complete rotation of the turret and upon the face of which is cut a dove-tailed groove. Sliding in this groove is a block 48, Figure 6, which may be set and locked in the groove for any angle of tilt up to fifteen minutes by the scale 50 shown on the disc 47. Block 48 carries a pin 51 which, working in the horizontal slot in a link 52, causes the latter to rise and fall as the turret or gun revolves. A bracket 53 restricts the link 52 to a purely vertical movement. Rod 54 connects the link 52 to the arm 21 as shown in Figure 1. The setting of disc 47 for the higher point of the roller path is accomplished by loosening a nut 55 on pin 51 and changing the relative position of disc 47 and the azimuth scale of the adjacent drum, Figure 5, until the arc on the disk 47 points to the angle of train when the path is highest, and while keeping drums 47 together both are rotated until the arc showing angle of train points to the actual bearing upon which the turret or gun is trained when the setting is being made. Then by tightening the nut 55 discs 47 and 49 will then be held together by friction or serrated surfaces.

From the above description it is believed that the construction, operation and method of use of the present invention will be clear to those skilled in the art. The attachment is of simple and practical construction, accurate, reliable and efficient in use and operation and it is believed to accomplish among others all of the objects and advantages herein set forth.

What we claim is:—

1. In an elevating attachment for ordnance, in combination with a roller gun support for training in azimuth, means for correcting errors in the angle of elevation due to inclination of the roller path and means cooperating therewith for correcting errors in elevation due to erosion.

2. In an elevating attachment for ordnance, in combination with a roller gun support for training in azimuth, means for correcting errors in the angle of elevation due to inclination of the roller path, means cooperating therewith for correcting errors in elevation due to erosion and differential gearing and devices interposed between said means whereby they cooperate together.

3. In an elevating attachment for ordnance, in combination with a roller gun support for training in azimuth, a member carrying a scale rotatable with the gun to indicate change in angle of elevation, a pointer coacting therewith, means for moving said pointer whereby correction due to errors of inclination of the roller path are indicated, and means coacting therewith for correcting for errors due to erosion, said last mentioned means including a shaft common to both means and having a differential gear connection.

4. In an elevating attachment for ordnance, in combination with a roller gun support for training in azimuth, a member carrying a scale rotatable with the gun to indicate the change in angle of elevation, a pointer coacting therewith, means for moving said pointer whereby correction due to errors of inclination of the roller path are indicated, means coacting therewith for correcting for errors due to erosion and a differential gear connected therewith, said last means including a shaft common to both means, a worm adapted to be rotated by said shaft, and means movable fore and aft with respect to the gun as said worm is rotated to actuate said differential gear mechanism.

5. In an elevating attachment for ordnance, in combination, a drum having a scale thereon rotatable proportionally to the change in angle of elevation, a pointer coacting with said scale, a shaft driven by said drum, gearing operated by said shaft and means adapted to correct for errors due to erosion operable by the rotation of said shaft.

6. In an elevating attachment for ordnance, in combination, a drum having a scale thereon rotatable proportionally to the change in angle of elevation, a pointer coacting with said scale, a shaft driven by said drum, gearing operated by said shaft, means adapted to correct for errors due to erosion operable by the rotation of said shaft, and means associated with said last mentioned means for correcting the erosion indicator.

Signed at Washington, District of Columbia, this 4th day of October, 1921.

WILLIAM H. P. BLANDY.

Signed at Washington, District of Columbia, this 18th day of October, 1921.

RICHMOND K. TURNER.